(12) United States Patent
Jones et al.

(10) Patent No.: US 10,442,025 B2
(45) Date of Patent: Oct. 15, 2019

(54) VIRTUAL REALITY CONTROLLED MOBILE ROBOT

(71) Applicant: ILLINOIS TOOL WORKS INC., Glenview, IL (US)

(72) Inventors: Jerald Edward Jones, Golden, CO (US); Valerie Lisa Rhoades, Golden, CO (US); Todd Earl Holverson, Appleton, WI (US); John Henry Gaffney, III, Denver, CO (US); Mark Dietrich Mann, Westminister, CO (US); Adam Nathan Cuneo, Golden, CO (US)

(73) Assignee: Illinois Tool Works Inc., Glenview, IL (US)

( * ) Notice: Subject to any disclaimer, the term of this patent is extended or adjusted under 35 U.S.C. 154(b) by 411 days.

(21) Appl. No.: 14/879,172

(22) Filed: Oct. 9, 2015

(65) Prior Publication Data

US 2016/0114418 A1     Apr. 28, 2016

Related U.S. Application Data

(60) Provisional application No. 62/067,311, filed on Oct. 22, 2014.

(51) Int. Cl.
*B23K 9/09*     (2006.01)
*B23K 9/095*    (2006.01)
(Continued)

(52) U.S. Cl.
CPC .......... *B23K 9/0953* (2013.01); *B23K 9/0956* (2013.01); *B23K 9/1087* (2013.01);
(Continued)

(58) Field of Classification Search
CPC .. B23K 9/0953; B23K 9/0956; B23K 9/1087; B23K 9/1274; B23K 9/16; B23K 10/00;
(Continued)

(56) References Cited

U.S. PATENT DOCUMENTS 6,019,606 A * 2/2000 Yamamoto ........... G05B 19/427
                                                    434/45
6,445,964 B1    9/2002 White
(Continued)

FOREIGN PATENT DOCUMENTS

| CN | 1490135 | 4/2004 |
| CN | 101745765 | 6/2010 |

(Continued)

OTHER PUBLICATIONS

International Search Report from PCT application No. PCT/US2015/055844, dated Feb. 10, 2016, 12 pgs.

*Primary Examiner* — Brian W Jennison
(74) *Attorney, Agent, or Firm* — McAndrews, Held & Malloy, Ltd.

(57) ABSTRACT

In certain embodiments, a portable metal working robot system includes a metal working tool configured to perform a metal working process on one or more metal parts. In addition, the portable metal working robot system includes communication circuitry configured to receive control signals from a control system located remotely from the portable metal working robot system. The portable metal working robot system also includes control circuitry configured to control operational parameters of the portable metal working robot system in accordance with the received control signals.

21 Claims, 6 Drawing Sheets

(51) Int. Cl.
  *B23K 9/10* (2006.01)
  *B23K 9/127* (2006.01)
  *B23K 9/16* (2006.01)
  *B23K 10/00* (2006.01)
  *B23K 37/02* (2006.01)
  *B23K 31/00* (2006.01)
  *B62D 57/024* (2006.01)

(52) U.S. Cl.
  CPC .............. *B23K 9/1274* (2013.01); *B23K 9/16* (2013.01); *B23K 10/00* (2013.01); *B23K 31/006* (2013.01); *B23K 37/0258* (2013.01); *B23K 37/0282* (2013.01); *B23K 37/0288* (2013.01); *B23K 37/0294* (2013.01); *B62D 57/024* (2013.01)

(58) Field of Classification Search
  CPC .............. B23K 31/006; B23K 37/0258; B23K 37/0282; B23K 37/288; B23K 37/0294; B23K 37/0217; B23K 37/0252
  USPC ....................................... 219/124.1
  See application file for complete search history.

(56) References Cited

U.S. PATENT DOCUMENTS

| | | | |
|---|---|---|---|
| 8,747,116 B2 | 6/2014 | Zboray | |
| 8,834,168 B2 | 9/2014 | Peters | |
| 8,851,896 B2 | 10/2014 | Wallace | |
| 8,911,237 B2 | 12/2014 | Postlethwaite | |
| 9,011,154 B2 | 4/2015 | Kindig | |
| 9,101,994 B2 | 8/2015 | Albrecht | |
| 9,196,169 B2 | 11/2015 | Wallace | |
| 2006/0144835 A1 | 7/2006 | Pan | |
| 2010/0176106 A1* | 7/2010 | Christensen | B23K 37/0252 219/137 R |
| 2010/0213242 A1 | 8/2010 | Fujimoto | |
| 2010/0224610 A1* | 9/2010 | Wallace | B23K 9/0953 219/137 R |
| 2011/0290765 A1 | 12/2011 | Albrecht | |
| 2012/0111843 A1* | 5/2012 | Beard | B23K 9/173 219/136 |
| 2013/0211592 A1* | 8/2013 | Kim | B25J 3/00 700/258 |
| 2014/0091129 A1 | 4/2014 | Peters | |
| 2014/0376770 A1* | 12/2014 | Nister | G06K 9/00536 382/103 |

FOREIGN PATENT DOCUMENTS

| | | |
|---|---|---|
| CN | 102298858 | 12/2011 |
| CN | 104057202 | 9/2014 |
| DE | 10048000 | 1/2002 |
| JP | 2003200372 | 7/2003 |

* cited by examiner

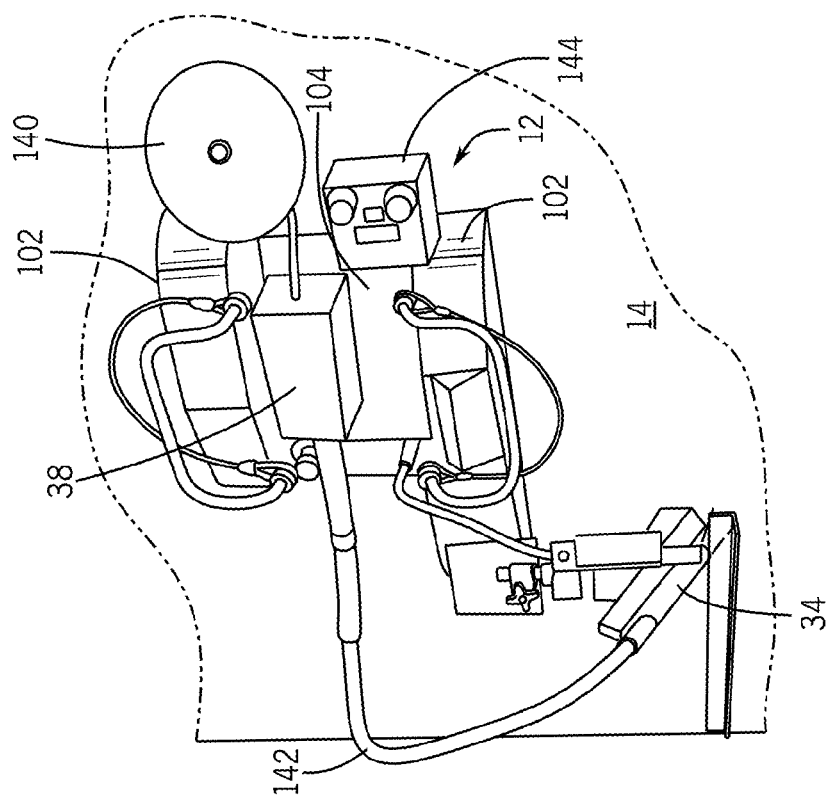
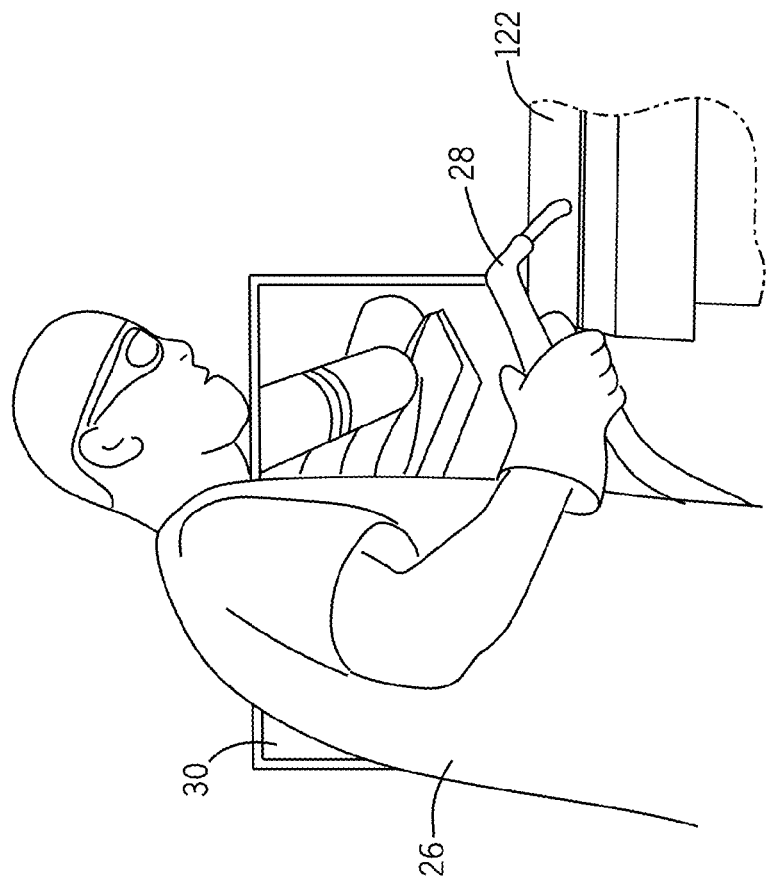
FIG. 3B
FIG. 3A

VIRTUAL REALITY CONTROLLED MOBILE ROBOT

CROSS-REFERENCE TO RELATED APPLICATIONS

This application is a non-provisional application of U.S. Provisional Patent Application No. 62/067,311, entitled "Virtual Reality Control Robot", filed Oct. 22, 2014, which is herein incorporated by reference in its entirety for all purposes.

BACKGROUND

The present disclosure relates generally to welding and cutting and, more particularly, to automated welding and metal cutting processes and systems using robotic manipulators including portable robots and a "human-in-the-loop" using a virtual reality (or augmented reality) environment.

Metals are the structural materials of choice for most fabricating. Welding and cutting of metals are primary processes used in the fabrication of structures, ships, pipes, tanks, wind towers, automobiles, and many other components and products. Consequently, as quality and productivity requirements increase, automated systems will be required to meet those demands. Today, the fabricating industry depends on robot systems for many fabrication operations. One major fabricating industry is the shipbuilding industry; consequently, shipbuilding examples are included in this description. However, other fabricating industries may also benefit from the robotic systems described herein.

BRIEF DESCRIPTION

In certain embodiments, a welding or cutting robot system includes a robot manipulator, a welding or cutting torch, a robot and a process control system, and one or more sensors. The welding or cutting torch is moved in a direction along a weld or cut joint and the welding or cutting torch is manipulated by the robot so that, for example, a welding electrode is pointed toward a weld joint. Once the welding or cutting process is started, the robot begins moving the welding or cutting torch and the angle of the welding or cutting torch is adjusted as it is moved along the weld or cut joint in order to direct the welding or cutting arc in such a manner as to produce a weld or cut. The robot motion and the welding or cutting torch angles of the present disclosure are directed by the movement of a control device, which may be a real or simulated welding or cutting torch or other control device, by a human operator. The movement of the control device is tracked by one or more sensors. The motion of the control device is calculated by a computer program. The motion of the control device is translated into robot control commands such that the robot is directed to move the welding or cutting torch in the same direction, angles, and speed as the control device is being manipulated by the human. Furthermore, one or more video cameras are attached to the robot and are directed so as to capture images of the welding or cutting torch and the weld or cut joint. This video data is transmitted to a computer program, which displays the video data as an image on a computer display system. Such a system may be described as having a "human-in-the-loop". The video display images provide the human operator with sufficient information to guide the robot and welding or cutting torch motion, just as would be done if the operator were holding the welding or cutting torch, rather than the robot.

DRAWINGS

These and other features, aspects, and advantages of the present disclosure will become better understood when the following detailed description is read with reference to the accompanying drawings in which like characters represent like parts throughout the drawings, wherein:

FIG. 3A is a perspective view of a local control system configured to remotely control the welding or cutting robot illustrated in FIG. 3B, in accordance with embodiments of the present disclosure;

FIG. 3B is a perspective view of the welding or cutting robot being remotely controlled by the local control system illustrated in FIG. 3A, in accordance with embodiments of the present disclosure;

DETAILED DESCRIPTION

Figure 1A:
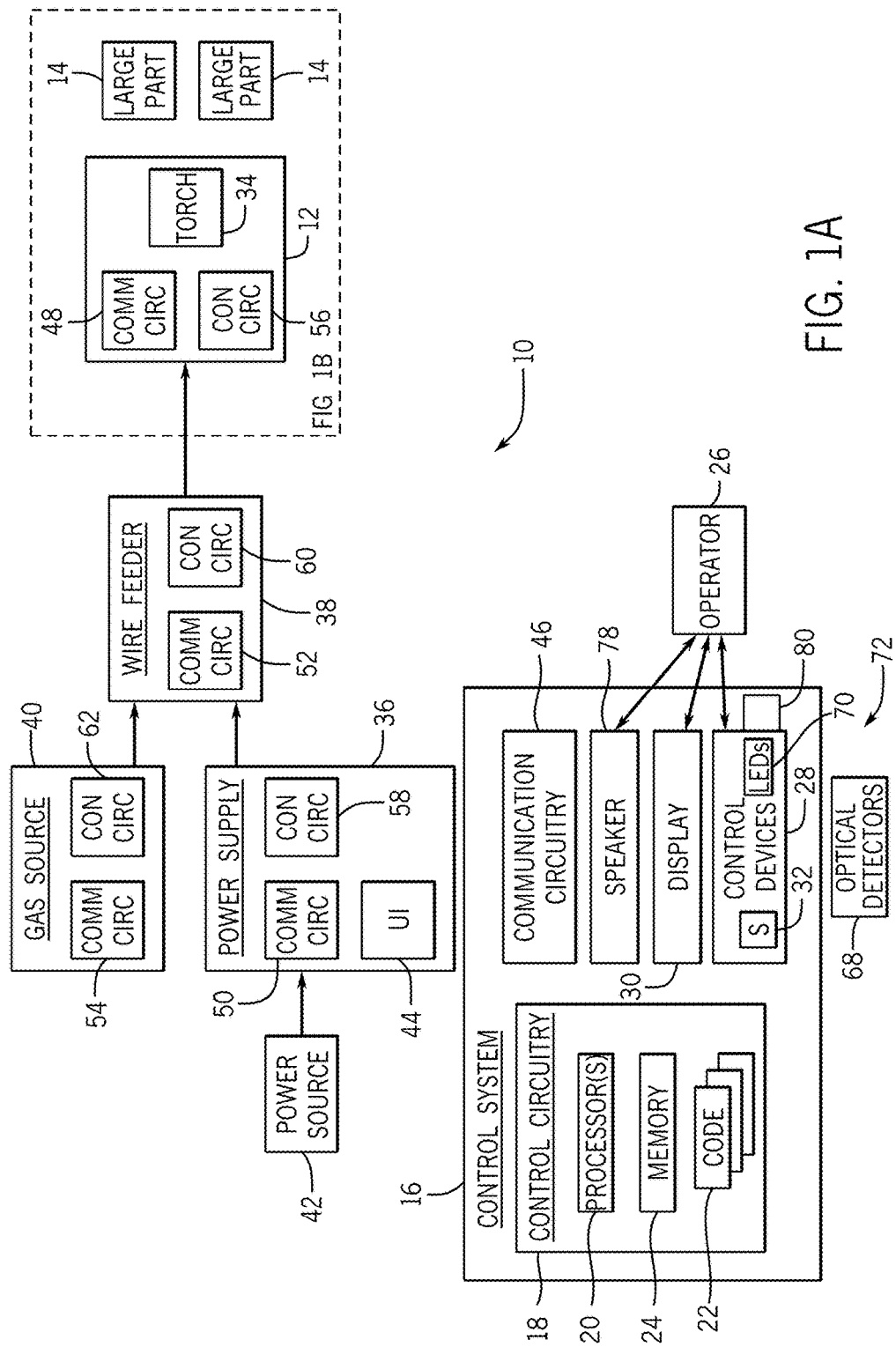
FIG. 1A is a schematic diagram of an embodiment of a system for facilitating virtual reality assisted (or augmented reality assisted) control of a portable welding or cutting robot configured to perform a welding or cutting process on large parts, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The cost of manual welding can be significant, and skilled welders have a generally higher wage than other skilled workers. In addition, the welding equipment must accommodate for the limitations of a human, including the capacity to lift and hold a welding torch for a full shift. Welding is done in all positions, so frequently the welder must stand, sit, or lay down in an uncomfortable position. The welding process produces high intensity light, which requires welding with a mask. In addition, welding also generates fumes, superheated sparks, and pieces of hot metal. These and other conditions, such as the weather, can cause fatigue and can significantly reduce the productivity of these highly skilled individuals. A robot system with a heavy water-cooled welding torch, which is capable of more power than the lighter weight air-cooled manual welding torch, can deposit several times as much weld metal per unit time. However, this welding torch is relatively heavy and has relatively heavy thick copper cables and, thus, is not suitable for manual use. In much of welding, it is difficult, impossible, or prohibitively expensive to produce a perfect weld joint, which is required for a pre-programmed welding robot. A skilled human welder can easily manipulate a welding torch by adjusting the torch angles, the welding travel speed, and the torch position and still produce a high quality weld. A robot system controlled by a skilled human can accomplish high quality welding, and the robot can carry the weight of the heavy torch which can weld much faster.

By combining the sensory capability and welding skill of a human welder with the lifting capacity and weld travel speed of a robot, it is possible to produce welds that a robot cannot make, and at productivity levels several times that of the human welder. The resulting combination of high quality welds and high productivity levels justifies the expenditure necessary for such a system. Additionally, it is relatively costly to create robot control programs and to utilize the heavy and precise fixturing necessary to always position the parts to be welded in the exact location where a robot is programmed to weld. These costs can only be justified if the robot will be making very high numbers of parts, for example, producing parts for an automobile in which production will include several tens of thousands of vehicles. Generally, manual welding has been applied, instead of robotics, when the number of parts is relatively small and the cost of precision forming or machining each part to ensure a high quality weld joint is too high. In order for a human welder to be able to properly manipulate the welding torch motion, welding torch angles, and welding torch location to produce a high quality weld by manual welding, the welder must be at the location of the weld and near enough to hear and to see, in great detail, the welding arc, liquid weld pool, and the local geometry of the weld joint, and be able to visualize it all in a three-dimensional understanding of the elements of the welding operation. It is, thus, important for the welder controlling the robot to have that same three-dimensional visualization environment in order to produce high quality welds.

FIG. 1A is a schematic diagram of an embodiment of a system 10 for facilitating virtual reality assisted (or augmented reality assisted) control of a portable welding or cutting robot 12 configured to perform a welding or cutting process on large parts 14, for example, ship panels being assembled in a shipbuilding process. Although primarily described herein as relating to welding or cutting robots 12 (i.e., performing welding or plasma cutting operations), other types of metal working processes, such as induction heating (or, indeed, other types of heating, such as infrared heating, laser heating, and so forth), may also benefit from the portable remotely controlled robot embodiments described herein. For example, in certain embodiments, a portable induction heating robot equipped with an induction heating head may be controlled in a similar manner as the portable welding or cutting robot 12 described herein. In addition, while primarily described herein as including virtual reality assisted control of the welding or cutting robot 12, in other embodiments, augmented reality representations of the welding or cutting process may be used instead of virtual reality representations. For example, instead of displaying a virtual reality view of the welding or cutting process, captured video from the welding or cutting process may be augmented with virtual reality elements.

As illustrated in FIG. 1A, the system 10 includes a control system 16 that includes control circuitry 18, which may in certain embodiments include one or more processors 20 configured to execute computer readable instructions 22 (e.g., executable computer code) stored in one or more memory media 24. In certain embodiments, the computer readable instructions 22 are executable to facilitate remote control of the welding or cutting robot 12 by, for example, presenting a virtual reality (or augmented reality) environment to an operator 26 of the control system 16 and receiving control inputs from the operator 26 via one or more control devices 28. More specifically, in certain embodiments, a virtual reality (or augmented reality) representation of the welding or cutting robot 12 performing a welding or cutting operation on a virtual reality (or augmented reality) representation of the parts 14 being worked on may be displayed on a display device 30 by the control circuitry 18 of the control system 16. In certain embodiments, the display device 30 may include a single computer monitor, multiple computer monitors or video projection systems (e.g., each displaying portions of the virtual/augmented reality representation), virtual/augmented reality goggles, virtual/augmented reality glasses, and so forth.

Based on the virtual reality (or augmented reality) representation displayed on the display device 30, the operator 26 may manipulate the one or more control devices 28 to control the welding or cutting process performed by the welding or cutting robot 12 in real time (e.g., during performance of the welding or cutting process). In certain embodiments, the one or more control devices 28 may be shaped similarly to a welding or cutting torch such that the operator 26 may have the sensation of performing a conventional welding or cutting process, for example, on smaller scale parts despite the fact that the actual welding or cutting process is being performed on a much larger scale, which would not be possible for manual welding or cutting by the operator 26, as described herein. In certain embodiments, the one or more control devices 28 may include positional sensors 32, such as gyroscopes, accelerometers, and so forth, which may be used to determine position, orientation, and/or movement data of the one or more control devices 28, which may be used by the control system 16 to control the position, orientation, and/or movement (e.g., work angle, travel angle, contact tip to work distance, and so forth) of a welding or cutting torch 34 of the welding or cutting robot 12 in accordance with the position, orientation, and/or movement data of the one or more control devices 28. In addition, in certain embodiments, the one or more control devices 28 may include input mechanisms (e.g., trackballs, sliders, triggers, buttons, switches, computer mice, joysticks, and so forth) configured to adjust operational parameters of the welding or cutting robot 12

(e.g., voltage and/or current of the welding or cutting arc produced by the welding or cutting torch 34 of the welding or cutting robot 12, travel speed of the welding or cutting robot 12, wire feed speed of welding wire delivered by the welding or cutting torch 34 of the welding or cutting robot 12, and so forth) and/or to adjust the virtual reality view being displayed on the display device 30 (e.g., panning, zooming, and so forth).

In certain embodiments, gestures, such as hand movements, finger movements, head movements, and so forth, may also be tracked by positional sensors, and the control circuitry 18 of the control system 16 may adjust the virtual (or augmented) reality representation being displayed on the display device 30 or determine position, orientation, and/or movement data of the one or more control devices 28 based on the tracked gestures. Furthermore, the control circuitry 18 of the control system 16 may control the position, orientation, and/or movement (e.g., work angle, travel angle, contact tip to work distance, and so forth) of the welding or cutting torch 34 of the welding or cutting robot 12 in accordance with the tracked gestures.

As illustrated in FIG. 1A, the welding or cutting robot 12 may be coupled to a welding or cutting power supply 36, an optional welding wire feeder 38 (e.g., in the case of a welding robot 12), and an optional gas source 40. It will be appreciated that, in certain embodiments, the welding or cutting power supply 36, the optional welding wire feeder 38 (in the case of a welding robot 12), and/or the optional gas source 40 may be directly incorporated into the welding or cutting robot 12 to create a more compact welding or cutting operation. In certain embodiments, the welding or cutting power supply 36 may be a power converter or an inverter based power supply requiring a power source 42. Many different circuit designs may be provided in the power source 42, and many different welding regimes may be envisaged (e.g., direct current, alternating current, pulsed, short circuit, and so forth). Any of these conventional circuits and process technologies may be used in conjunction with the present welding or cutting embodiments to provide the welding or cutting power to the welding or cutting torch 34 of the welding or cutting robot 12. In other embodiments, the welding or cutting power supply 36 may be a generator or alternator power supply, which may include an internal combustion engine. The welding or cutting power supply 36 may also include a user interface 44 for adjusting various welding parameters such as voltage and current, and for connecting a power source 42, if required. Additionally, the optional gas source 40 is the source of the shielding gas that is supplied to the welding or cutting torch 34 of the welding or cutting robot 12. For example, in certain embodiments, the optional gas source 40 may supply argon gas to the welding or cutting torch 34. As will be appreciated, the shielding gas is applied to the location of the liquid pool by the welding or cutting torch 34 to prevent absorption of atmospheric gases which may cause metallurgical damage to the weld, for example.

In certain embodiments, the welding or cutting power supply 36 may be coupled to the optional welding wire feeder 38 by a feeder power lead, a weld cable, a gas hose, and a control cable. The optional welding wire feeder 38 shown in the illustrated embodiment provides welding wire to a welding torch 34 for use in a welding operation (e.g., in the case of a welding robot 12). A variety of welding wires may be used. For example, the welding wire may be solid steel, solid aluminum, solid stainless steel, composite and flux cored wire, and so forth. The embodiments described herein may be used with any suitable type of electrode, and any suitable wire composition. Furthermore, the thickness of the welding wire may vary depending on the welding application for which the welding wire is used. For example, the welding wire may be 0.045", 0.052", ⅟₁₆", ³⁄₃₂", ⅛", or any other diameter. Furthermore, in certain embodiments, the optional welding wire feeder 38 may enclose a variety of internal components such as a wire feed drive system, an electric motor assembly, an electric motor, and so forth. The optional welding wire feeder 38 may further include a control panel (not shown) that allows a user to set one or more wire feed parameters, such as wire feed speed. The optional welding wire feeder 38 may be used with any wire feeding process including gas operations (gas metal arc welding (GMAW)) or gasless operations (shielded metal arc welding (SMAW) or self-shielding flux cored arc welding (FCAW)).

As illustrated in FIG. 1A, the control system 16 may also include communication circuitry 46 configured to facilitate communications between the control system 16 and various other components of the system 10. In certain embodiments, the communication circuitry 46 of the control system 16 may include wireless communication circuitry configured to facilitate wireless communications between the control system 16 and various other components of the system 10. However, the communication circuitry 46 of the control system 16 may also include communication circuitry configured to facilitate communications between the control system 16 and various other components of the system 10 via cables and other communication conduits. For example, the communication circuitry 46 of the control system 16 may be configured to send control signals to the communication circuitry 48, 50, 52, 54 of the welding or cutting robot 12, the welding or cutting power supply 36, the optional welding wire feeder 38 (e.g., in the case of a welding robot 12), and/or the optional gas source 40, respectively, to adjust operational parameters of these components of the system 10 via their respective control circuitry 56, 58, 60, 62.

For example, in certain embodiments, the control system 16 may send control signals to the welding or cutting robot 12 to adjust the position, orientation, and/or movement (e.g., work angle, travel angle, contact tip to work distance, and so forth) of the welding or cutting torch 34 of the welding or cutting robot 12 with respect to a main body of the welding or cutting robot 12 and/or the parts 14 being worked on. In addition, in certain embodiments, the control system 16 may send control signals to the welding or cutting power supply 36 to adjust the voltage, current, welding regime, and so forth, or the welding or cutting power delivered to the welding or cutting torch 34 of the welding or cutting robot 12. In addition, in certain embodiments, the control system 16 may send control signals to the optional welding wire feeder 38 to adjust a wire feed speed of the welding wire delivered to the welding or cutting torch 34 of the welding or cutting robot 12. In addition, in certain embodiments, the control system 16 may send control signals to the optional gas source 40 to adjust a flow rate of the shielding gas delivered to the welding or cutting torch 34 of the welding or cutting robot 12. These control signals are merely exemplary of the types of control signals that may be transmitted from the communication circuitry 46 of the control system 16 to the various components of the system 10, and are not intended to be limiting.

Figure 1B:
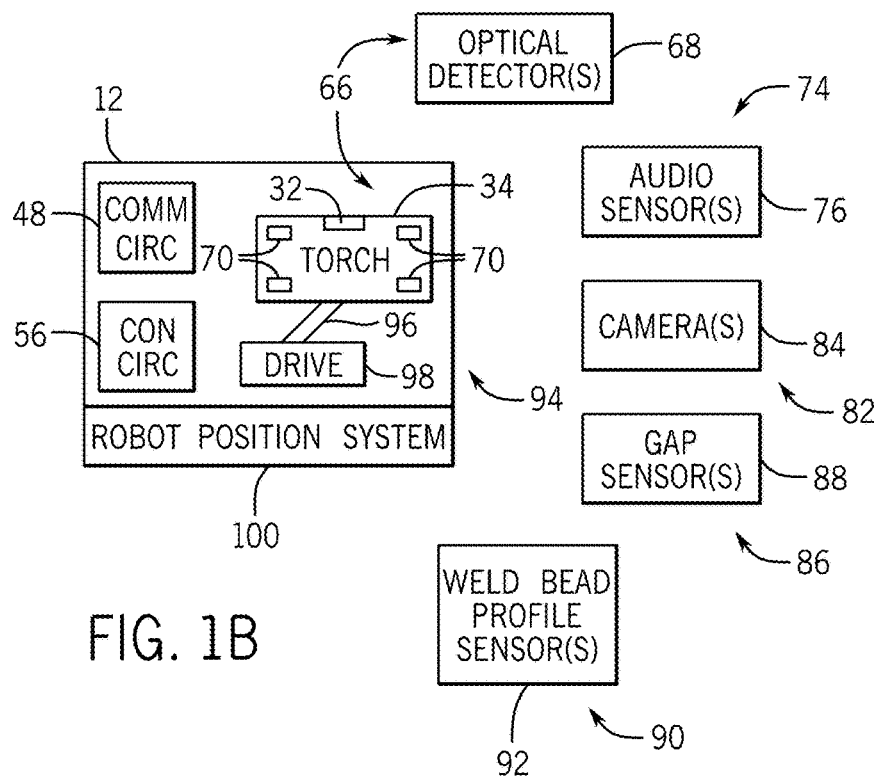
FIG. 1B is a schematic diagram of the welding or cutting robot of FIG. 1A, as well as other related components of the welding or cutting robot, in accordance with embodiments of the present disclosure.

In addition, in certain embodiments, the welding or cutting robot 12 may include one or more sensor systems 64 configured to detect operational parameters of the welding or cutting robot 12 locally (e.g., at or near the location of the welding or cutting robot 12), and these detected parameters may be transmitted (e.g., via the communication circuitry 48 of the welding or cutting robot 12) back to the communication circuitry 46 of the control system 16 for the purpose of providing control feedback to the control system 16. FIG. 1B is a schematic diagram of an embodiment of the welding or cutting robot 12 of FIG. 1A.

In certain embodiments, the one or more sensor systems 64 of the welding or cutting robot 12 may include a torch position sensor system 66 configured to detect a position, orientation, and/or movement of the welding or cutting torch 34 with respect to a main body of the welding or cutting robot 12 and/or the parts 14 being worked on. In certain embodiments, the torch position sensor system 66 may include one or more optical detectors 68 (e.g., infrared detectors, in certain embodiments) that are positioned on a main body of the welding or cutting robot 12 (e.g., to detect a position, orientation, and/or movement of the welding or cutting torch 34 with respect to the welding or cutting robot 12) and/or in the environment proximate the parts 14 being worked on (e.g., to detect a position, orientation, and/or movement of the welding or cutting torch 34 with respect to the parts 14), and which may be configured to detect light (e.g., infrared light, in certain embodiments) emitted from one or more light emitting diodes 70 (e.g., infrared light emitting diodes, in certain embodiments) that are positioned at specific locations on the welding or cutting torch 34. In other embodiments, instead of including one or more light emitting diodes 70 that emit light that is detected by the one or more optical detectors 68, the welding or cutting torch 12 may instead include one or more reflectors that passively reflect light (e.g., infrared light) from one or more external emitters or light sources (e.g., infrared emitters) that emit light (e.g., in the infrared wavelength band), and which may be disposed on a main body of the welding or cutting robot 12 and/or in the environment proximate to the parts 14 being worked on.

Furthermore, as illustrated in FIG. 1A, in certain embodiments, the position, orientation, and/or movement of the one or more control devices 28 may also be tracked by a control device position sensor system 72 that is substantially similar to the torch position sensor system 66 that tracks the position, orientation, and/or movement of the welding or cutting torch 34. In such embodiments, feedback relating to the position, orientation, and/or movement of the one or more control devices 28 may be provided by the control device position sensor system 72 to the control circuitry 18 of the control system 16 (e.g., in addition to, or alternative to, the positional sensors 32), and the control circuitry 18 may determine how to control the welding or cutting control robot 12 based at least in part on the feedback from the control device position sensor system 72.

In addition, in certain embodiments, the torch position sensor system 66 may include one or more positional sensors 32 (e.g., accelerometers, gyroscopes, and so forth) disposed within or on the welding or cutting torch 34 of the welding or cutting robot 12, and which may be configured to detect position, orientation, and/or movement of the welding or cutting torch 34. It will be appreciated that the data detected by the torch position sensor system 66 may be transmitted to the control system 16 via the communication circuitry 48 of the welding or cutting robot 12, and the control system 16 may use this detected data to determine the position, orientation, and/or movement of the welding or cutting torch 34 of the welding or cutting robot 12 (e.g., including, but not limited to, work angle, travel angle, contact tip to work distance, and so forth) based at least in part on this detected data.

In addition, in certain embodiments, the welding or cutting robot 12 may also include an audio sensor system 74 that may include one or more audio sensors 76 (e.g., HDR microphones collecting data at a rate of at least 20 kHz, in certain embodiments) that are positioned in the environment proximate the parts 14 being worked on, and which may be configured to detect acoustic data from the environment proximate the parts 14, wherein the acoustic data may be used by the control system 16 to determine various operational parameters of the welding or cutting robot 12. For example, the acoustic data detected by the audio sensor system 74 may be transmitted to the control system 16 via the communication circuitry 48 of the welding or cutting robot 12, and the control system 16 may use this detected data to determine the position, orientation, and/or movement of the welding or cutting torch 34 of the welding or cutting robot 12 based at least in part on this detected data, or may use the detected data to determine other operational parameters (e.g., power, current, voltage, weld quality, and so forth) of the welding or cutting torch 34. In certain embodiments, the acoustic data may be translated (e.g., by the control circuitry 56 of the welding or cutting robot 12) into an analog or digital signal before being transmitted to the control system 16.

In addition, in certain embodiments, the acoustic data transmitted to the control system 16 may be output via an audio output device 78 (e.g., speakers or user-wearable earphones, in certain embodiments) of the control system 16 such that the operator 26 of the control system 16 may hear the audible output from the audio output device 78 as an indicator of the current weld quality, and may adjust control of the welding or cutting robot 12 via the one or more control devices 28 based at least in part on this audible output. It will be appreciated that, in certain embodiments, the control circuitry 18 of the control system 16 may process the acoustic data received from the audio sensor system 74 of the welding or cutting robot 12 before outputting the audible output via the audio output device 78 of the control system 16. In addition, in certain embodiments, in addition to (or in place of) the audible output via the audio output device 78, the control system 16 may also include a tactile feedback system 80 that may, for example, generate a tactile output corresponding to the audible output, which the operator 26 may similarly use to adjust control of the welding or cutting robot 12 via the one or more control devices 28 based at least in part on this tactile feedback.

In addition, in certain embodiments, the welding or cutting robot 12 may include a video capture system 82 comprising one or more cameras 84 disposed on the welding or cutting robot 12 and directed in such a way that the one or more cameras 84 capture video data of the welding or cutting torch 34 of the welding or cutting robot 12, the welding or cutting arc, the environment around the welding or cutting arc, and so forth, and transmit the video data to the control system 16 via the communication circuitry 48 of the welding or cutting robot 12, and the control system 16 may use this video data to construct the three-dimensional virtual reality or augmented reality representation of the welding or cutting process that is displayed on the display device 30 of the control system 16.

In addition, in certain embodiments, the welding or cutting robot 12 may include a gap sensing system 86 comprising one or more gap sensors 88 configured to detect a gap (e.g., distance between) multiple parts 14 being worked on. For example, in certain embodiments, the one or more gap sensors 88 may include one or more optical sensors configured to obtain optical data relating to positioning of the multiple parts 14 being worked on, and the communication circuitry 48 of the welding or cutting robot 12 may transmit this optical data to the control system 16, wherein the control circuitry 18 of the control system 16 may determine gap data relating to gap distance between the parts 14 being worked on based at least in part on this optical data. In certain embodiments, the control circuitry 18 of the control system 16 may use this determined gap data to automatically adjust any of the operational parameters of the welding or cutting robot 12 described herein to maintain a size or shape of the weld or cut based at least in part on the determined gap data.

In certain embodiments, the control circuitry 18 of the control system 16 may use this determined gap data to automatically adjust the virtual reality graphical display of the parts 14 or to produce augmented reality graphics which overlay actual video data. In addition, in certain embodiments, the determined gap data may be used by the control circuitry 18 of the control system 16 to determine spatial relationships between the welding or cutting robot 12 (and/or the welding or cutting torch 34 of the welding or cutting robot 12) and the parts 14, such that these spatial relationships may be represented in the virtual reality view displayed on the display device 30. In other words, in certain embodiments, the determined gap data may be used to determine position, orientation, and/or movement of the welding or cutting robot 12 (and/or the welding or cutting torch 34 of the welding or cutting robot 12) relative to the parts 14 such that the virtual reality representation displayed on the display device 30 may be correctly adjusted (e.g., the respective coordinate systems may be synched, for example).

Similarly, in certain welding process embodiments, the welding robot 12 may include a weld bead profile sensing system 90 comprising one or more weld bead profile sensors 92 configured to detect a profile of a weld bead created by the welding arc generated by the welding torch 34 of the welding robot 12. For example, in certain embodiments, the one or more weld bead profile sensors 92 may include one or more optical sensors configured to obtain optical data relating to the weld bead profile, and the communication circuitry 48 of the welding or cutting robot 12 may transmit this optical data to the control system 16, wherein the control circuitry 18 of the control system 16 may determine weld bead profile data relating to the weld bead created by the welding arc generated by the welding torch 34 of the welding robot 12. In certain embodiments, the control circuitry 18 of the control system 16 may use this determined weld bead profile data to automatically adjust any of the operational parameters of the welding robot 12 described herein to maintain a desired weld size or shape based at least in part on the determined weld bead profile data. For example, in certain embodiments, the control circuitry 18 of the control system 16 may use this determined weld bead profile data to automatically adjust a welding procedure performed by a second welding torch (not shown) of the welding robot 12 to produce a cap weld on the top of an already deposited weld to produce a cap weld bead that has a geometric profile, which may improve the weld appearance, weld quality, weld metallurgical properties, weld mechanical properties, and so forth.

It should be noted that while described herein as transmitting data detected by the torch position sensor system 66, the audio sensor system 74, the video capture system 82, the gap sensing system 86, and the weld bead profile sensing system 90 to the control system 16 for processing by the control circuitry 18, in certain embodiments, the control circuitry 56 of the welding or cutting robot 12 may at least partially perform the processing of the detected data. For example, in certain embodiments, the control circuitry 56 of the welding or cutting robot 12 may be configured to detect when the welding or cutting torch 34 of the welding or cutting robot 12 is too far away from a joint formed between the parts 14 being worked on, and may determine how to adjust the position, orientation, and/or movement of the welding or cutting torch 34 with respect to the parts 14 (e.g., perhaps referred to as "gross motion control") without having to communicate with the control circuitry 18 of the control system 16 (e.g., perhaps referred to as "fine motion control").

In addition, it will be appreciated that, in certain embodiments, the welding or cutting robot 12 may include other types of sensors configured to detect other operational parameters of the welding or cutting robot 12 including, but not limited to, arc voltage, arc current, wire feed rate, height of the welding or cutting torch 34 of the welding or cutting robot 12 with respect to the parts 14 being worked on, position of the one or more optical detectors 68 of the torch position sensor system 66, angle and/or orientation of the welding or cutting robot 12 in three-dimensional space (perhaps referenced to the gravity vector or some other reference), data from the rotational sensors on the joints of a multi-axis torch position manipulation system 94 that provides information that enables the control circuitry 18 of the control system 16 to determine the position, orientation, and/or movement of the welding or cutting torch 34, and so forth.

In addition, in certain embodiments, the welding or cutting robot 12 may include sensors that provide logistical data. For example, in certain embodiments, the welding or cutting robot 12 may include sensors configured to collect data that enable the control circuitry 18 of the control system 16 to determine an amount of welding wire that has been fed through the welding wire feeder 38 (e.g., by collecting sensor data relating to a rate of rotation of drive rolls of the welding wire feeder 38, etc.), an amount of shielding gas that has been delivered by the gas source 40 (e.g., by collecting sensor data relating to flow rates of shielding gas through valves, etc.), a condition of wear of a contact tip of the welding or cutting torch 34 of the welding or cutting robot 12 (e.g., by detecting sensor data relating to detected "arc-on" time of the welding or cutting torch 34, etc.), or other logistics related information.

Furthermore, in certain embodiments, the welding or cutting robot 12 may include sensors that provide management data. For example, in certain embodiments, the welding or cutting robot 12 may include sensors (e.g., timers, etc.) configured to collect data that enable the control circuitry 18 of the control system 16 to determine an amount of time a welding arc was turned on and how much time the welding arc was not turned on and not producing a weld. In certain embodiments, this information may be combined with other sensor data to determine a total length of all welds that have been produced by the welding or cutting robot 12 over certain time periods. In addition, in certain embodiments, the welding or cutting robot 12 may include temperature sensors that produce data relating to temperature of one or more components of the welding or cutting robot 12 or of the parts 14 to enable the control circuitry 18 of the control system 16 to determine a need for maintenance on the welding or cutting robot 12 for a condition-based maintenance system, or to determine the heating and cooling rate of the metal parts 14 or the weld for the purpose of predicting the metallurgical characteristics of the metal parts 14 or the weld.

In addition, in certain embodiments, the welding or cutting robot 12 may include sensors that provide process quality data. For example, in certain embodiments, the welding or cutting robot 12 may include sensors (e.g., ultrasonic sensors, etc.) configured to collect data that enable the control circuitry 18 of the control system 16 to determine a quality of a weld produced by the welding robot 12 or a quality of a cut produced by the cutting robot 12. Such data may be processed to the enable the control circuitry 18 of the control system 16 to determine the weld quality using a numerical model of the welding or cutting process. An exemplary system may use data such as welding voltage, welding current, wire feed speed, gas flow rate, and welding torch position and/or orientation data to predict the size and shape of a weld using a numerical model of the welding process or an artificial neural network which has outputs that describe the shape and size of the weld and/or engineering measurements of the weld (e.g., bead height, weld toe angles, weld depth of penetration, etc.).

It will be appreciated that each of the sensors and/or sensor systems described herein may include wireless communication circuitry capable of communicating wirelessly with the communication circuitry 48 of the welding or cutting robot 12 such that the control circuitry 56 of the welding or cutting robot 12 may process the detected sensor signals from the sensors and/or sensor systems before communicating these detected sensor signals (or data relating to the detected sensor signals) to the control system 16. For example, the wireless communication circuitry may include circuitry capable of communicating via wireless protocols such as IEEE 802.15.1 Bluetooth®, IEEE 802.15.4 with or without a ZigBee® stack, IEEE 802.11x Wi-Fi, and so forth.

In additions, in certain embodiments, the welding or cutting robot 12 includes a plurality of position manipulation systems. For example, in certain embodiments, the welding or cutting robot 12 includes a multi-axis torch position manipulation system 94 configured to adjust a position, orientation, and/or movement of the welding or cutting torch 34 with respect to a main body of the welding or cutting robot 12 (and thereby with respect to the weld or cut being created on the parts 14). For example, in certain embodiments, the multi-axis torch position manipulation system 94 may include one or more multi-axis arms 96 coupled to the welding or cutting torch 34, and one or more multi-axis drives 98 configured to manipulate the multi-axis arms 96 to adjust the position, orientation, and/or movement of the welding or cutting torch 34 with respect to a main body of the welding or cutting robot 12 in the full three-dimensional space (e.g., with six degrees of freedom).

In addition, in certain embodiments, the welding or cutting robot 12 includes a multi-axis robot position manipulation system 100 configured to adjust a position, orientation, and/or movement of the welding or cutting robot 12 with respect to a structure external to the welding or cutting robot 12. For example, in certain embodiments, similar to the multi-axis torch position manipulation system 94, the multi-axis robot position manipulation system 100 may include one or more multi-axis arms coupled to the welding or cutting robot 12, and a multi-axis drive configured to manipulate the one or more multi-axis arms to adjust the position, orientation, and/or movement of the welding or cutting robot 12 with respect to an external support structure, such as a gantry structure, which may have a relatively fixed position, at least with respect to the parts 14 being worked on. However, in other embodiments, the welding or cutting robot 12 may take the form of a portable "crawler" and the multi-axis robot position manipulation system 100 may include one or more magnetic treads 102 that facilitate movement of the welding or cutting robot 12 with respect to the parts 14. Although described herein as including magnetic one or more treads, in other embodiments, one or more wheels or a pneumatic vacuum system (e.g., as an alternative to magnetic treads) may be used to facilitate movement of the welding or cutting robot 12 with respect to the parts 14. In certain embodiments, the one or more magnetic treads 102 (or wheels or a pneumatic vacuum system) may be disposed on a main body of the welding or cutting robot 12, and the one or more magnetic treads 102 (or wheels or a pneumatic vacuum system) may be configured to attach to the metal surfaces of the parts 14 being worked on, such that movement of the magnetic treads 102 (or wheels or a pneumatic vacuum system) with respect to the main body of the welding or cutting robot 12 causes movement of the welding or cutting robot 12 with respect to the parts 14. In such an embodiment, the welding or cutting robot 12 is portable (e.g., is capable of being manually carried by a single human) such that it may be manually attached (e.g. magnetically) to the parts 14 at a desired location.

Regardless of the specific mechanical features employed, the multi-axis torch position manipulation system 94 and/or the multi-axis robot position manipulation system 100 may be controlled by the control circuitry 18 of the control system 16 such that position, orientation, and/or movement of the welding or cutting torch 34 with respect to the welding or cutting robot 12 and/or position, orientation, and/or movement of the welding or cutting robot 12 with respect to an external support structure may be controlled by the operator 26 during performance of the welding or cutting process, for example, in accordance with manipulation of the one or more control devices 28 of the control system 16.

Figure 2:
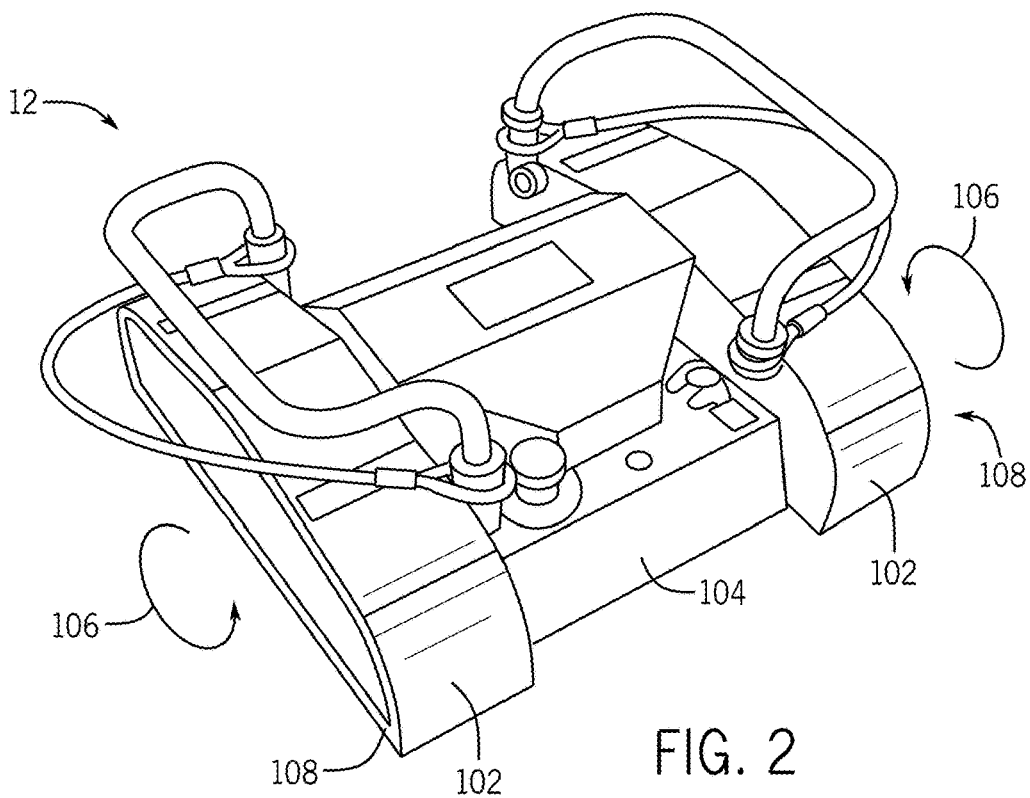
FIG. 2 is a perspective view of the welding or cutting robot of FIGS. 1A and 1B, in accordance with embodiments of the present disclosure.

As discussed herein, in certain embodiments, the welding or cutting robot 12 may take the form of a portable "crawler" and the multi-axis robot position manipulation system 100 may include one or more magnetic treads 102 (or wheels or a pneumatic vacuum system) that facilitate movement of the welding or cutting robot 12 with respect to the parts 14 being worked on. FIG. 2 is a perspective view of an embodiment of the welding or cutting robot 12 as a portable "crawler" having one or more magnetic treads 102. In particular, as illustrated in FIG. 2, the magnetic treads 102 may be disposed on opposite sides of a main body 104 of the welding or cutting robot 12. It will be appreciated that the magnetic treads 102 are configured to rotate around the main body 104 of the welding or cutting robot 12, as illustrated by arrows 106, to facilitate movement of the welding or cutting robot 12 (e.g., with respect to surfaces of the parts 14 being worked on). As will be appreciated, the magnetic treads 102 of the welding or cutting robot 12 are configured to attach (e.g., magnetically) to surfaces of the parts 14 being worked on to enable the welding or cutting robot 12 to be moved about the surfaces of the parts 14.

As discussed herein, in certain embodiments, the magnetic treads 102 (as part of the multi-axis robot position manipulation system 100) may be controlled by the control system 16. For example, in certain embodiments, each of the magnetic treads 102 of the welding or cutting robot 12 may be driven by respective tracks 108, which are in turn driven by respective motors (not shown) disposed within the main body 104 of the welding or cutting robot 12, wherein the control system 16 controls the respective motors to generate desired rates of rotation and directions of rotation of the tracks 108 to cause corresponding rates of rotation and directions of rotation of the magnetic treads 102. More specifically, the rate of rotation and direction of rotation of each of the magnetic treads 102 may be controlled to adjust the speed and direction of movement of the welding or cutting robot 12 with respect to a surface of the one or more parts 14 being contacted by the respective magnetic tread 102. Furthermore, in certain embodiments, the rate of rotation and direction of rotation of each of the magnetic treads 102 may be controlled separately such that, for example, one magnetic tread 102 may rotate with respect to the main body 104 of the welding or cutting robot 12 in one direction while another magnetic tread 102 rotates with respect to the main body 104 in an opposite direction (and/or at a different speed), thereby causing the welding or cutting robot 12 to rotate with respect to surfaces of the one more parts 14 being contacted by the magnetic treads 102. Furthermore, in certain embodiments, each of the tracks 108 may also be configured to independently move with respect to the main body 104 of the welding or cutting robot 12 such that, for example, a distance of the main body 104 with respect to a surface of the parts 14 may be adjusted by the control system 16.

As described herein, the welding or cutting robot 12 may be remotely controlled by the operator 26. For example, FIG. 3A illustrates an embodiment where the operator 26 performs a simulated welding or cutting operation locally (e.g., in proximity to the display 30, one or more control devices 28, and so forth, of the control system 16, which are discussed with respect to FIG. 1A) while an actual welding or cutting operation is performed remotely (e.g., at a location remote from the display 30, one or more control devices 28, and so forth, of the control system 16) on the parts 14 in accordance with input from the one or more control devices 28 of the control system 16, as illustrated in FIG. 3B. More specifically, as illustrated in FIG. 3A, in certain embodiments, the operator 26 may view a virtual (or augmented) reality representation of the welding or cutting operation on the display 30 while manipulating a simulated welding or cutting torch (i.e., as a control device 28). As described in greater detail herein, the simulated welding or cutting torch is but one example of a control device 28 that can be used to receive inputs from the operator 26, and is not intended to be limiting. The displayed virtual (or augmented) reality representation provides the operator 26 with the necessary information to properly control the angles, motion, and location of the simulated welding or cutting torch (and/or other control devices 28).

As described herein, in certain embodiments, video data (e.g., captured by the video capture system 82 illustrated in FIG. 1B) may be modified by the control circuitry 18 of the control system 16. For example, the video data may be modified to alter, add, or subtract portions of the video images that are displayed or projected on the display 30. This alteration may include adjusting the brightness of the entire image or one or more portions of the image, removing one or more portions of the image; or adding one or more objects or one or more areas of text into the image. In addition, the image may be altered by the control circuitry 18 of the control system 16, for instance, modified so that when displayed it produces multiple images that are offset to provide the human operator 26 with a simulated three-dimensional image. In certain embodiments, information may be provided to the operator 26 in the form of text or objects added to the image, for instance, arrows displayed on or near a portion of the image displaying the welding or cutting torch 34 of the welding or cutting robot 12, to provide the operator 26 with directions for redirecting the welding or cutting torch 34 or changing the torch angles of the welding or cutting torch 34. One or more other text or objects may be added to the image to provide information about the welding or cutting operation, including weld size and/or shape, weld or cut quality, or other information.

In certain embodiments, the control circuitry 18 of the control system 16 may use computer numerical models, for example, an artificial neural network model, to calculate the size and/or shape of the weld or cut represented in the virtual/augmented reality representation of the welding or cutting operation. For example, in a virtual reality representation, the calculated size and/or shape of the weld or cut may be represented, whereas in an augmented reality representation, the image of the weld or cut captured by the video capture system 82 may be adjusted (e.g., altered) by the control circuitry 18 of the control system 16 based at least in part on the calculated size and/or shape of the weld or cut. In addition, in certain embodiments, the control circuitry 18 may use one or more numerical models or one or more artificial neural network models to produce weld quality information.

Figure 4A:
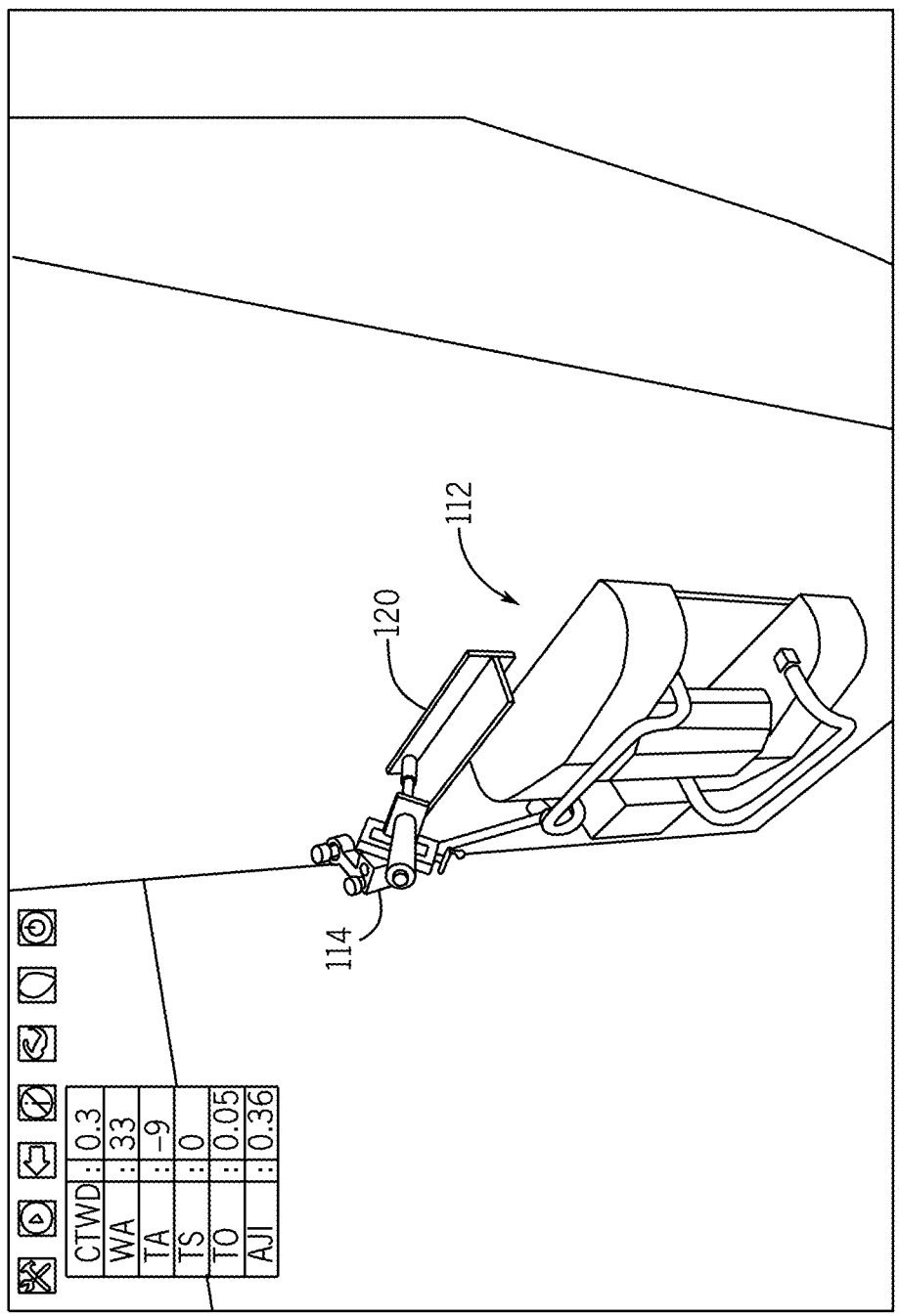
FIG. 4A illustrates a virtual reality representation that resembles the actual parts being worked on, in accordance with embodiments of the present disclosure.
Figure 4B:
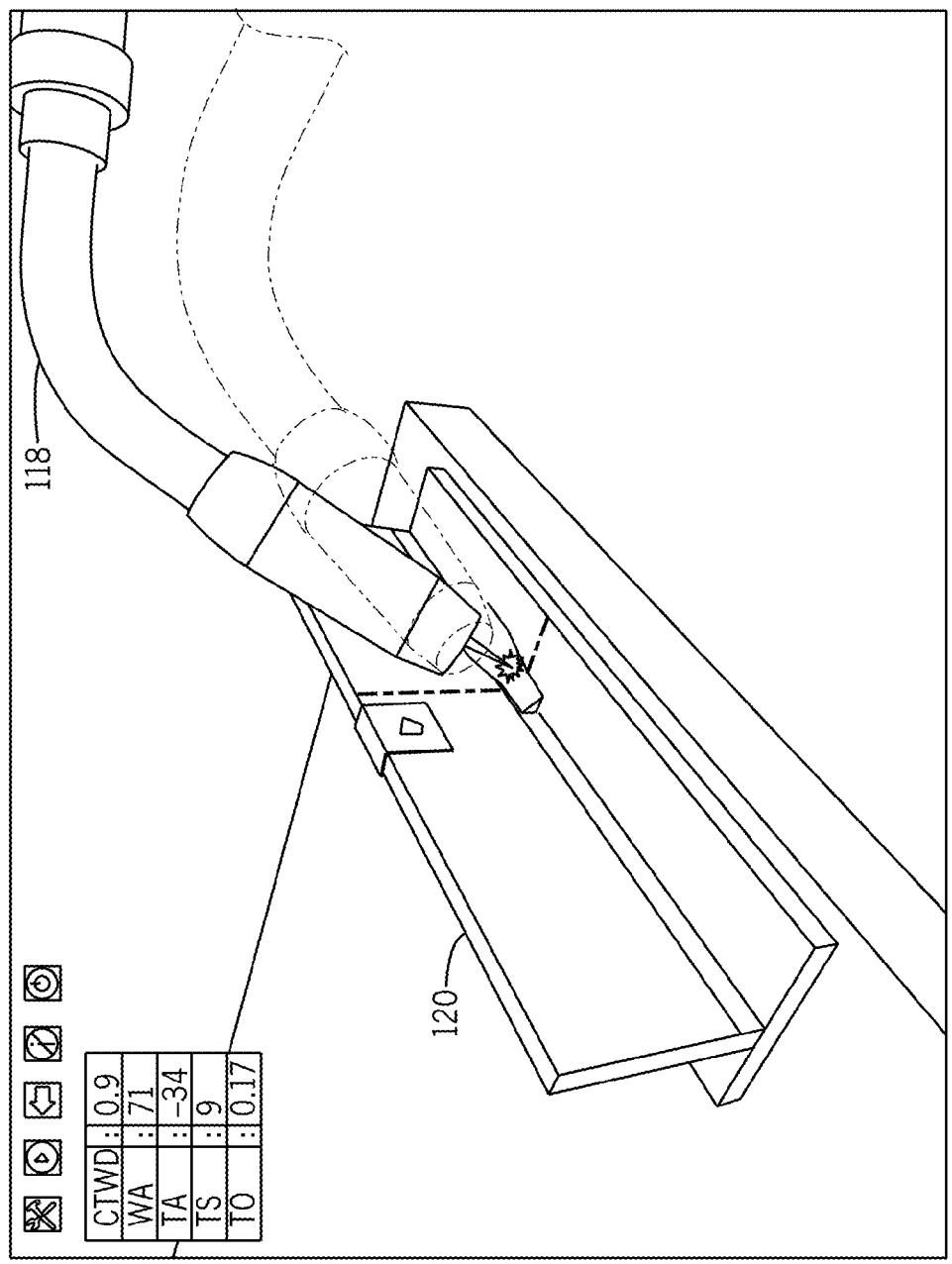
FIG. 4B illustrates a virtual reality representation that portrays a virtual version of a control device being manipulated by an operator, in accordance with embodiments of the present disclosure.

FIGS. 4A and 4B illustrate exemplary virtual reality representations that may be displayed on the display 30 and which may be used as visual feedback to the operator 26 while the operator 26 manipulates the one or more control devices 28 locally, and the welding or cutting robot 12 performs an actual welding or cutting operation on the parts 14 remotely in accordance with inputs received via the one or more control devices 28. More specifically, FIG. 4A illustrates a virtual reality representation 110 that resembles the actual parts 14 being worked on, with a virtual welding or cutting robot 112 having a virtual welding or cutting torch 114, whereas FIG. 4B illustrates a virtual reality representation 116 that portrays a virtual version (i.e., virtual control device 118) of a control device 28 being manipulated by the operator 26 in spatial relation with respect to a virtual workpiece 120 that corresponds to an actual workpiece 122 that the operator 26 is moving the actual control device 28 with relation to perform a simulated welding or cutting operation. As illustrated in FIGS. 4A and 4B, the virtual workpiece 120 may be represented virtually in both virtual reality representations 110, 116 such that the operator 26 is aided in manipulating the control device 28 to cause a desired actual welding or cutting operation on the actual parts 14 being worked on.

Figure 5:
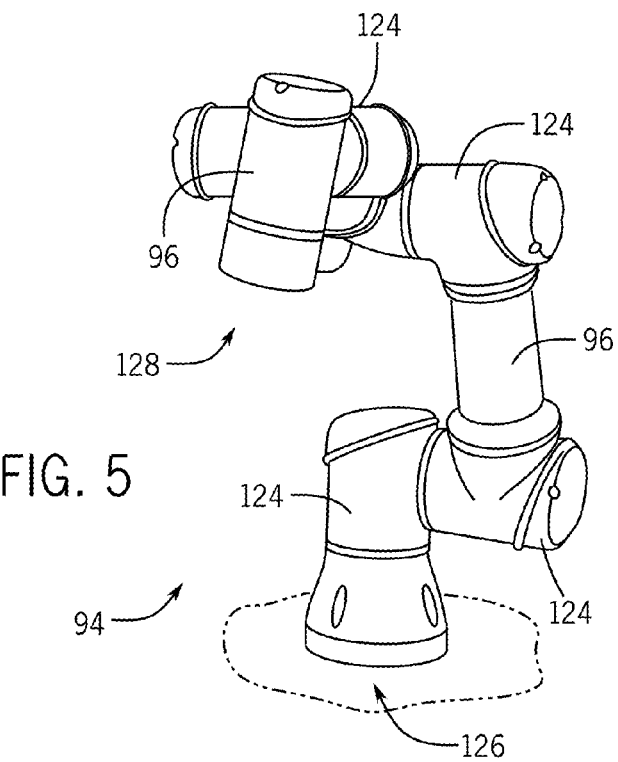
FIG. 5 is a perspective view of a multi-axis torch position manipulation system of the welding or cutting robot, in accordance with embodiments of the present disclosure.

As described herein, in certain embodiments, the welding or cutting robot 12 may include a multi-axis torch position manipulation system 94 configured to adjust the position, orientation, and/or movement of the welding or cutting torch 34 with respect to the main body 104 of the welding or cutting robot 12 in the full three-dimensional space (e.g., with six degrees of freedom). FIG. 5 illustrates an embodiment of the multi-axis torch position manipulation system 94. As illustrated, in certain embodiments, the multi-axis torch position manipulation system 94 includes a plurality of multi-axis arms 96 connected together via a plurality of joints 124 in such a way that a first end 126 of the multi-axis torch position manipulation system 94 may be attached to the main body 104 of the welding or cutting robot 12, and an opposite, second end 128 of the multi-axis torch position manipulation system 94 may be attached to the welding or cutting torch 34 of the welding or cutting robot 12, such that the position, orientation, and/or movement of the welding or cutting torch 34 may be adjusted with respect to the main body 104 of the welding or cutting robot 12 in the full three-dimensional space (e.g., with six degrees of freedom).

In certain embodiments, one or more multi-axis drives 98 may be disposed within the multi-axis torch position manipulation system 94 and may manipulate the positioning of the plurality of multi-axis arms 96 with respect to each other based on control signals received from the control system 16.

Figure 6:
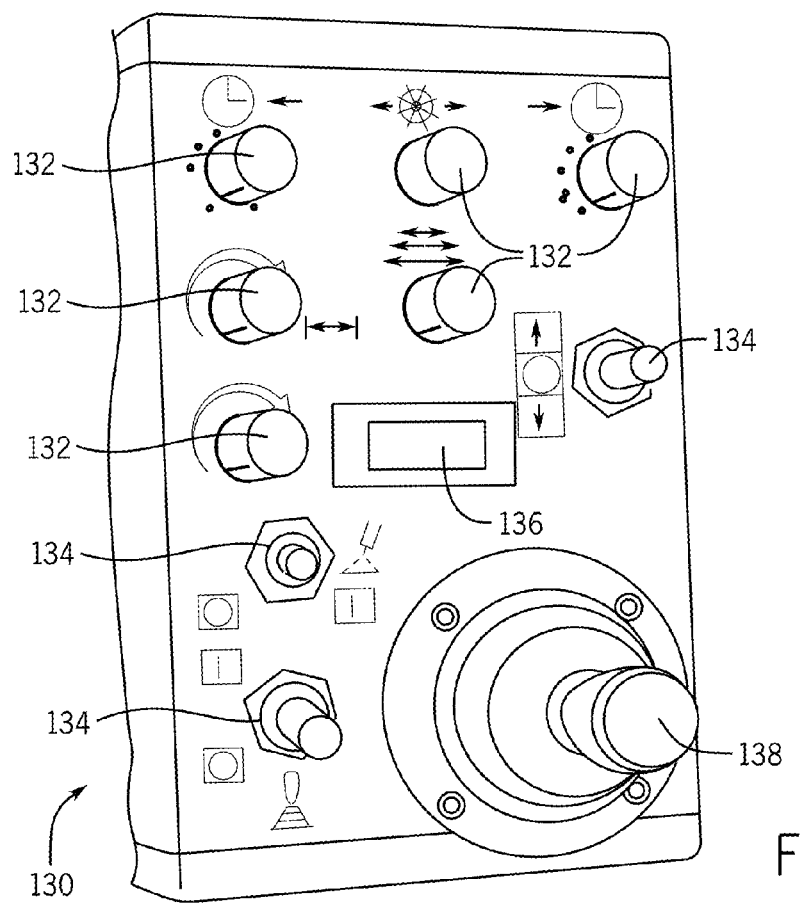
FIG. 6 is a perspective view of a remote control device for controlling the welding or cutting robot, in accordance with embodiments of the present disclosure.

Returning now to FIG. 3A, although illustrated as being a simulated welding or cutting torch, in other embodiments, the one or more control devices 28 described herein may take different forms. For example, as illustrated in FIG. 6, in certain embodiments, a control device 28 may take the form of a remote control device 130 having a plurality of inputs, such as a plurality of knobs 132 for adjusting various operational parameters, push buttons 134 for enabling certain modes of operation, for example, displays 136 for displaying various operational parameter values, and so forth. In additions, in certain embodiments, the remote control device 130 may include a joystick 138 that may be used to adjust the positioning of the welding or cutting robot 12 and/or the welding or cutting torch 34 with respect to the main body 104 of the welding or cutting robot 12.

As described with respect to FIG. 1A, in certain embodiments, the welding or cutting power supply 36, the optional welding wire feeder 38 (in the case of a welding robot 12), and/or the optional gas source 40 may be directly incorporated into the welding or cutting robot 12 to create a more compact welding or cutting operation. More specifically, in certain embodiments, the welding or cutting power supply 36, the optional welding wire feeder 38 (in the case of a welding robot 12), and/or the optional gas source 40 may be directly attached to (or, indeed, incorporated into) the main body 104 of the welding or cutting robot 12. For example, as illustrated in FIG. 3B, in certain embodiments, the welding wire feeder 38 may be directed attached to the main body 104 of the welding robot 12. To facilitate the self-sufficiency of the welding robot 12, a wire feed spool 140 of the welding wire feeder 38 may also be directed attached to the main body 104 of the welding robot 12, and the welding wire feeder 38 may pull welding wire from the wire feed spool 140, and deliver the welding wire to the welding torch 34 through a weld cable 142.

In addition, in certain embodiments, the welding or cutting robot 12 may include an enclosure configured to enclose many of the components of the welding or cutting robot 12. For example, in certain embodiments, the main body 104 of the welding or cutting robot 12 may enclose the welding or cutting power supply 36, the optional welding wire feeder 38 (in the case of a welding robot 12), the optional gas source 40, and several other components of the welding or cutting robot 12. In addition, in certain embodiments, the main body 104, the treads 102, the tracks 108, the welding or cutting torch 34, and the weld cable 142 may not be enclosed by the main body 104. Furthermore, in such embodiments, the main body 104, the treads 102, the tracks 108, the welding or cutting torch 34, and the weld cable 142 may be configured to be watertight and to withstand relatively high pressures (e.g., subsea pressures that are experienced at subsea depths of 100 meters or greater) such that the welding or cutting robot 12 may be used as a submersible welding or cutting robot 12 configured to perform underwater welding or cutting operations, which may be remotely controlled by the control system 16 described herein.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A control system comprising:
   one or more display devices configured to display a virtual reality representation or an augmented reality representation of a metal working process being performed by a remotely located portable metal working robot system on one or more metal parts;
   one or more control devices to control movement of the remotely located portable metal working robot system, the one or more control devices configured to be manipulated by an operator, wherein a control device of the one or more control devices has a shape of a metal working tool and is configured to generate inputs based on a simulated metal working process being performed by the operator, the inputs transmitted as control signals to the remotely located portable metal working robot system to control the metal working process based on the simulated metal working process;
   control circuitry configured to control the one or more display devices to display the virtual reality representation or the augmented reality representation of the metal working process based on one or more inputs from the one or more control devices and on data from one or more sensors of the remotely located portable metal working robot system; and
   communication circuitry configured to:
      receive the one or more inputs of the one or more control devices;
      transmit the control signals for controlling the remotely located portable metal working robot system, wherein the control signals are based at least in part on the one or more inputs of the one or more control devices; and
      control the one or more display devices to display a virtual reality representation or an augmented reality representation of the metal working tool in response to the control signals.

2. The control system of claim 1, wherein the metal working process comprises a welding process.

3. The control system of claim 1, wherein the metal working process comprises a plasma cutting process.

4. The control system of claim 1, wherein the metal working process comprises a heating process.

5. The control system of claim 1, wherein the communication circuitry is configured to receive data relating to one or more operational parameters from sensor systems of the portable metal working robot system, and the control circuitry is configured to adjust the virtual reality representation or the augmented reality representation of the metal working process displayed on the one or more display devices based at least in part on the received data.

6. The control system of claim 5, wherein the control circuitry is configured to provide information relating to a quality of the metal working process on one or more display devices based at least in part on the received data.

7. The control system of claim 1, wherein the control circuitry comprises a neural network model.

8. The control system of claim 1, further comprising a position sensor system configured to detect a position, orientation, or movement of the one or more control devices, and wherein the control circuitry is configured to determine the control signals based at least in part on the detected position, orientation, or movement of the one or more control devices.

9. The control system of claim 8, wherein the position sensor system comprises one or more light emitting diodes disposed on the one or more control devices, and one or more optical detectors configured to detect light transmitted from the one or more light emitting diodes.

10. The control system of claim 8, wherein the position sensor system comprises one or more motion sensors disposed within or on the one or more control devices.

11. The control system of claim 5, wherein the operational parameters comprise at least one of a position of a metal working tool, an orientation of the metal working tool, or movement of the metal working tool.

12. The control system of claim 1, wherein the communication circuitry is configured to receive acoustic data from an environment proximate the remotely located portable metal working robot system.

13. The control system of claim 1, wherein the communication circuitry is configured to receive video data of at least one of the metal working tool, the metal working process, or an environment proximate the remotely located portable metal working robot system.

14. The control system of claim 1, wherein the communication circuitry is configured to receive gap data relating to a distance between the one or more metal parts.

15. The control system of claim 1, wherein the communication circuitry is configured to receive data relating to a profile of a weld bead created by a welding arc generated by the metal working tool.

16. The control system of claim 1, wherein the communication circuitry is configured to transmit the control signals, based at least in part on the one or more inputs, to adjust a position of the metal working tool, an orientation of the metal working tool, or movement of the metal working tool.

17. The control system of claim 1, further comprising a gap sensing system having multiple sensors to detect dimensions of a gap between the one or more metal parts.

18. The control system of claim 1, wherein control circuitry is further configured to modify the sensor data to display multiple images of the metal working process offset from one another to present a three-dimensional virtual reality or augmented reality representation of the metal working process.

19. A control system for a remotely located portable metal working robot system, the control system comprising:
a first control device to control a robot position manipulation system configured to control a position or an orientation of the remotely located portable metal working robot system wherein the first control device is configured to be manipulated by an operator;
a second control device having a shape of a metal working tool, the second control device to generate inputs based on a simulated metal working process being performed by the operator, the inputs transmitted as control signals to the remotely located portable metal working robot system to control a multi-axis torch manipulation system configured to control a position or an orientation of a multi-axis torch of the remotely located portable metal working robot system, wherein the first and second control devices are configured to be manipulated by an operator;
one or more display devices configured to display a virtual reality representation or an augmented reality representation of a metal working process being performed by the remotely located portable metal working robot system on one or more metal parts based on one or more inputs from the first or second control devices and on data from one or more sensors of the remotely located portable metal working robot system; and
communication circuitry configured to:
receive one or more inputs from the first or second control devices, the one or more inputs corresponding to a change in a position or an orientation of the remotely located portable metal working robot system or the multi-axis torch;
transmit control signals corresponding to the one or more inputs to control the robot position manipulation system or the multi-axis torch manipulation system; and
control the one or more display devices to display a virtual reality representation or an augmented reality representation of the metal working tool in response to the control signals.

20. The control system of claim 17, the communication circuitry further configured to:
determine gap data based on the dimensions of the gap between the one or more metal parts; and
adjust the virtual reality representation or the augmented reality representation based on the determination.

21. The control system of claim 17, the communication circuitry further configured to:
determine spatial data including position, orientation, and/or movement of the metal working tool relative to the one or more metal parts based on the dimensions of the gap; and
adjust the virtual reality representation or the augmented reality representation of the metal working tool based on the determination.

* * * * *